United States Patent [19]

Postlethwait et al.

[11] Patent Number: 4,468,531

[45] Date of Patent: Aug. 28, 1984

[54] SAFETY SHIELD ASSEMBLY FOR A DRAWOUT-TYPE CIRCUIT BREAKER

[75] Inventors: James H. Postlethwait, Hartford; William F. Olashaw; Roger Kusek, both of Plainville, all of Conn.

[73] Assignee: General Electric Company, New York, N.Y.

[21] Appl. No.: 322,347

[22] Filed: Nov. 18, 1981

[51] Int. Cl.³ .............................................. H01H 9/22
[52] U.S. Cl. ................................ 200/50 AA; 361/345
[58] Field of Search ................. 361/345; 200/153 SC, 200/144 B, 145, 50 AA

[56] References Cited

U.S. PATENT DOCUMENTS 3,920,939 11/1975 Ciboldi et al. ...................... 361/345

Primary Examiner—J. V. Truhe
Assistant Examiner—Gregory D. Thompson
Attorney, Agent, or Firm—Richard A. Menelly; Walter C. Bernkopf; Fred Jacob

[57] ABSTRACT

A safety shield assembly for insertion within a drawout circuit breaker compartment between the load and line receivers in the compartment and the power stabs on the circuit breaker. The shield assembly utilizes a moveable shield, a pair of spring motors and a pair of actuating probes to operate the shield. One spring motor and one actuating probe are attached on either side of the circuit breaker compartment and both probes must be actuated before the spring motors can draw the moveable shield into an open position to expose the line and load receivers. The probes include a compression spring at its point of contact with the circuit breaker to compensate for overtravel.

14 Claims, 5 Drawing Figures

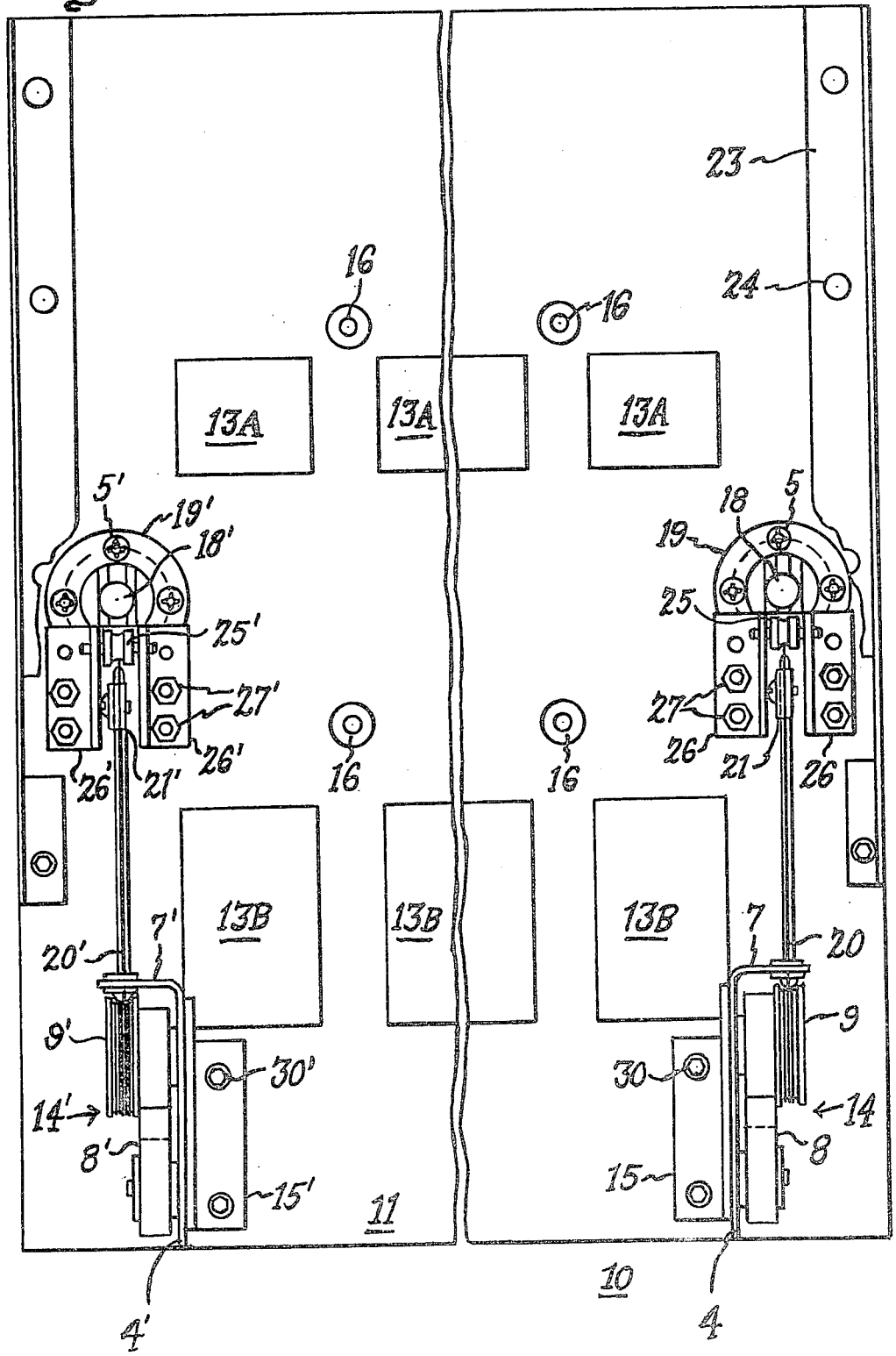

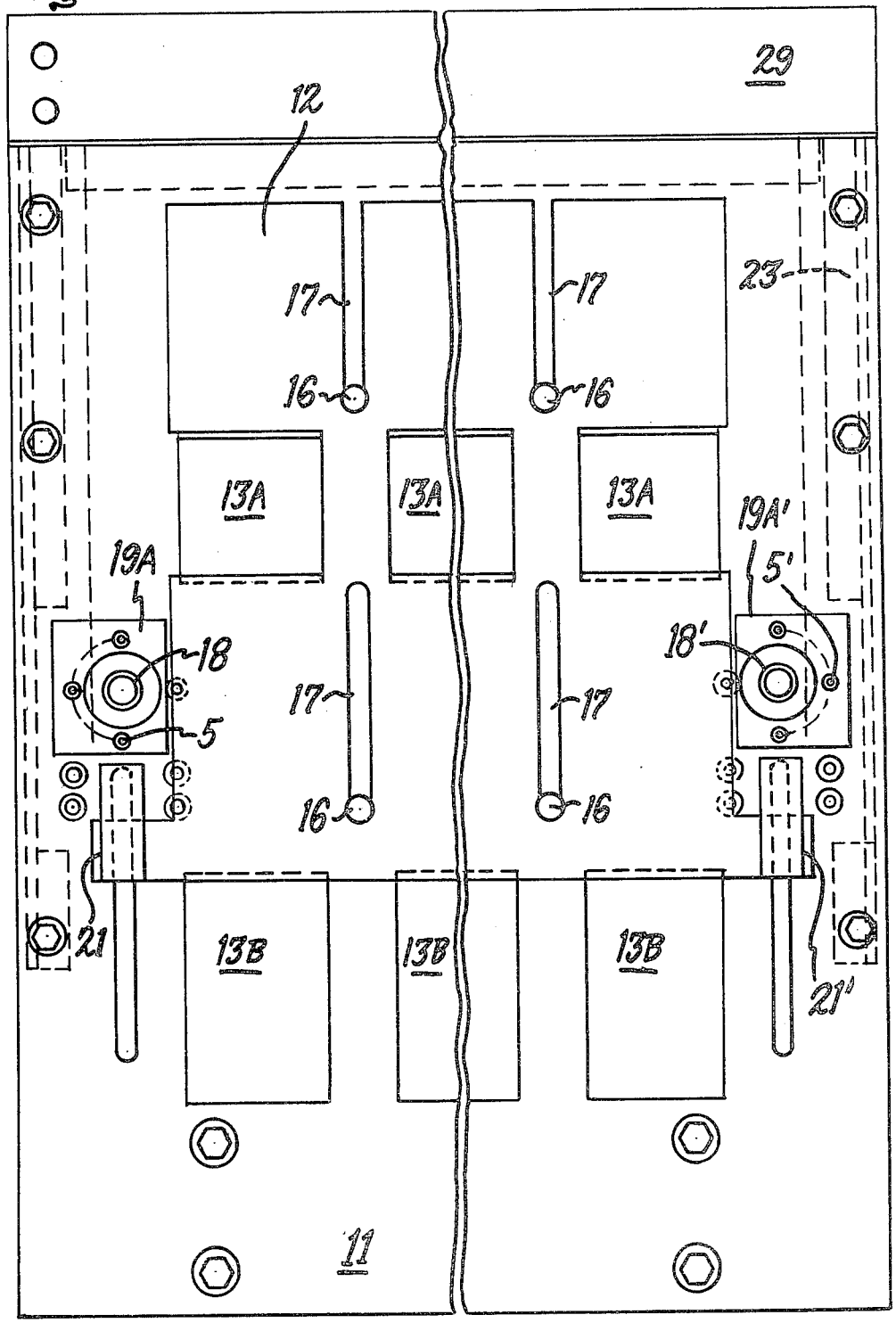

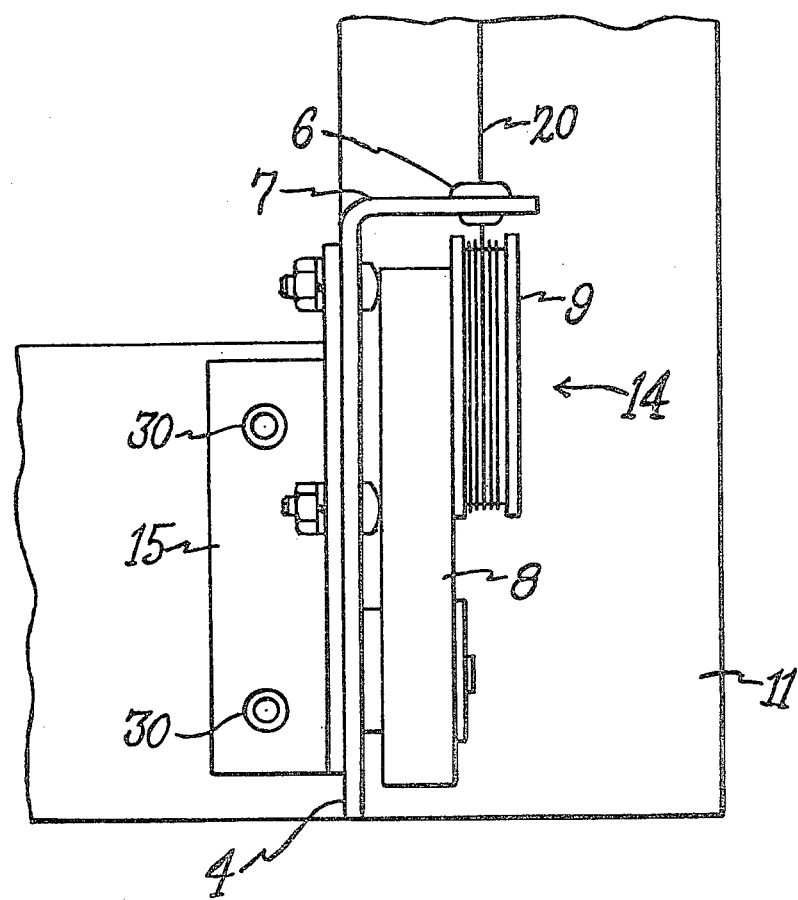

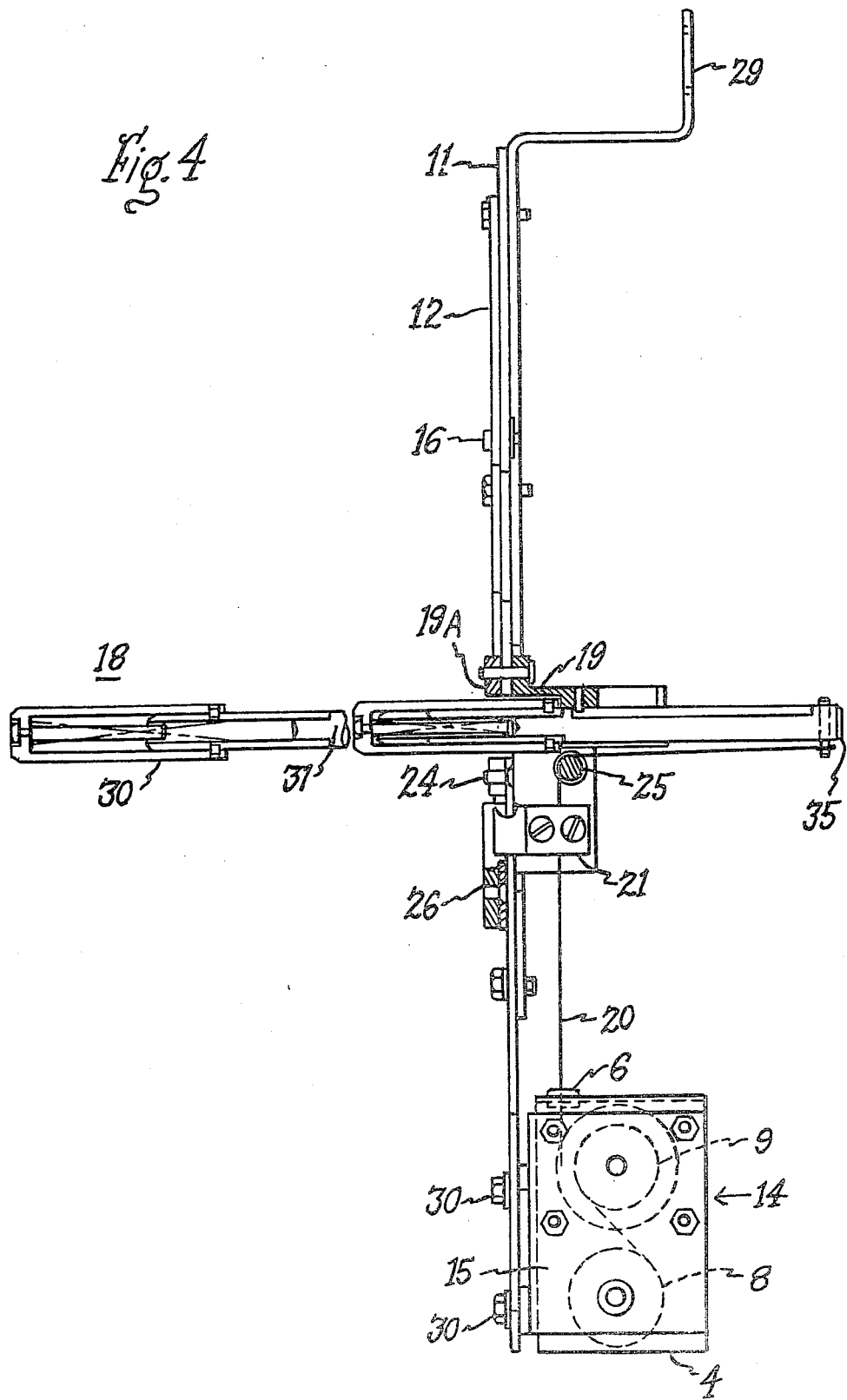

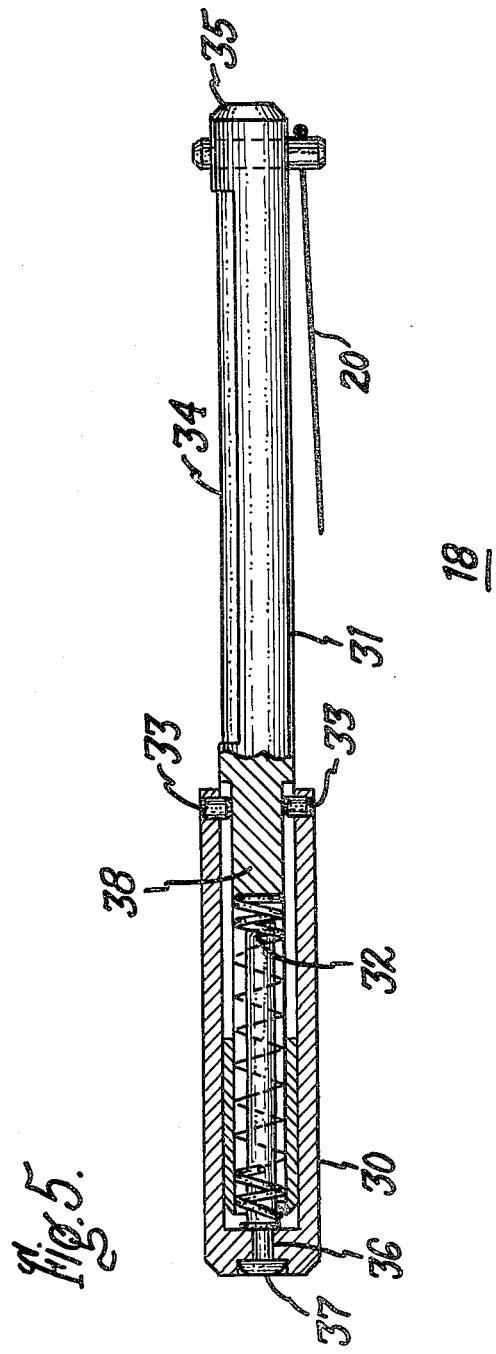

SAFETY SHIELD ASSEMBLY FOR A DRAWOUT-TYPE CIRCUIT BREAKER

BACKGROUND OF THE INVENTION

U.S. patent application Ser. No. 322,348, which is incorporated herein for purposes of reference, discloses several patents, each of which teaches the imposition of means to isolate the compartment power receivers upon removing the circuit breaker from the compartment. The aforementioned U.S. patent application utilizes a balanced arrangement of shutter linkage mechanisms on both sides of the unit to prevent manual operation by an operator in any attempt to bypass the shield unit. The present invention distinguishes over the aforementioned U.S. patent application by employing "roller-line" mechanism on both sides of the breaker compartment to prevent manual operation of the shield unit when the breaker is removed from the compartment.

SUMMARY OF THE INVENTION

A roller-line safety shield mechanism utilizes a pair of spring motors, one on either side of the breaker compartment, in combination with a corresponding pair of actuating probes and guides linked to the motors by means of a cable. The cable is attached to one end of the actuating probe, clamped to one of the guides, extended over a roller and is attached to the spring motor at an opposite end. Insertion of the circuit breaker within the compartment causes the rear surface of the breaker to contact the probes on either side of the breaker moving the probes back, lifting the moveable shield and unwinds both spring motors. The unwinding of the spring motors results in a torque exerted to the moveable shield via the cable and the guide clamp. Retracting the circuit breaker from the compartment disengages the actuating probes and allows the spring motors to draw the moveable shield into a closed position. The provision of a compression spring within the end portion of the probe, that contacts the breaker, compensates for the overtravel which exists between the motion of the circuit breaker in a horizontal plane and the motion of the moveable shield in the vertical plane.

BRIEF DESCRIPTION OF THE DRAWINGS

FIG. 1 is a rear view of the shield assembly according to the invention;

FIG. 2 is a front view of the shield assembly depicted in FIG. 1;

FIG. 3 is an enlarged view of the spring motor depicted in FIG. 1;

FIG. 4 is a side view of the shield assembly shown in FIGS. 1 and 2; and

FIG. 5 is an enlarged view of the probe depicted in FIG. 4.

DESCRIPTION OF THE PREFERRED EMBODIMENT

FIGS. 1 and 2 show a shield assembly 10 for insertion in front of the load and line receivers of a circuit breaker compartment (not shown) for providing isolation of load and line receivers contained within the circuit breaker compartment since the shield assembly 10 contains similar elements on opposite sides of the moveable shield 12, common elements on the opposite side of the shield are expressed as 5', 7', 8', 9', 15', 19', 19A', 25', 26', 27' and 30' as shown in FIG. 1. When the circuit breaker is removed from the circuit breaker compartment, shield assembly 10 operates to prevent access to the load and line receivers within the breaker compartment. When shield assembly 10 is inserted within the circuit breaker compartment, fixed shield 11, shown in FIG. 1 and and consisting of an insulative material such as a glass enforced plastic resin attached to a side frame 23 on both sides by means of bolts 24, is positioned such that line slots 13A and load slots 13B align with the load and line receivers within the breaker compartment. Connection between the load and line stabs on the circuit breaker and the line and load receivers in the breaker compartment is made through line and load slots 13A, 13B respectively. Spring motor 14 attached to fixed shield 11 by means of bracket 15 provides motive force to move moveable shield 12 of FIG. 2 relative to fixed shield 11 by means of rivets 16 attached to fixed shield 11 and guide slots 17 formed in moveable shield 12. Moveable shield 12 is shown in FIG. 2 in an open position relative to fixed shield 11 so that line slots 13A and load slots 13B allow access to the breaker compartment load and line receivers. Actuating probe 18, attached to fixed shield 11 by means of collar 19, collar mounting base 19A, and screws 5, contacts a portion of the circuit breaker causing moveable shield 12 to move into the open position depicted in FIG. 2. Cable 20 connects between spring motor 14 and probe 18 through roller 25. Roller 25, held to fixed shield 11 by means of brackets 26 and screws 27, seats cable 20. One end of cable 20 is securely fastened to moveable shield 12 by means of moveable shield clamp 21 as shown in FIG. 2. A similar spring motor 14', probe 18' and cable 20' and moveable shield clamp 21' are located at the opposite edge of fixed shield 11. When contact is made with probe 18, force is applied to cable 20 which, being attached to moveable shield clamp 21, causes moveable shield 12 to slide within guide slots 17 into the open position depicted in FIG. 2 against the opposing force of spring motor 14. The opposing force exerted by spring motor 14 is selected such that contact with only one of the two probes 18, 18' is not sufficient to overcome the opposing force of both spring motors 14, 14' as well as the forces of friction and gravity, and hence moveable shield 12 remains in the closed position depicted in dashed lines in FIG. 2.

Spring motor 14, shown in greater detail in FIG. 3, contains a roller 9 around which cable 20 is wound and a coiled takeup spring 8 such that when cable 20 is pulled through cable guard 6 located on top of roller 9 by means of bracket 7, coil takeup spring 8 becomes unwound and exerts a restoring force to cable 20. When the circuit breaker is removed from the breaker compartment, such that probe 18 is no longer in contact with the circuit breaker, coil takeup spring 8 winds up causing cable 20 to wind back upon roller 9.

The arrangement between spring motor 14, probe 18, fixed shield 11 and moveable shield 12 is shown in FIG. 4. Spring motor 14 is attached to the bottom portion of fixed shield 11 by means of bracket 15 and screws 30. Coiled takeup spring 8 and roller 9 are contained within casing 4 such that cable 20 passes in and out of casing 5 through guard 6. Roller 25, attached to fixed shield 11 by means of bracket 26 and bolt 24, FIG. 1, guides cable 20 which is attached to probe 18 at one end. Probe 18 contains a contact sleeve 30 slideably mounted on a barrel 31 extending through fixed shield 11 and retained therein by means of collar 19. Upon contacting a portion of the circuit breaker on its travel within the circuit breaker compartment, contact sleeve 30 is forced back on barrel 31, in turn causing cable 20 to unwind coil takeup spring 8 and, at the same time through moveable guide clamp 21, move moveable shield 12 vertically into the open position indicated in FIG. 2 exposing line slots 13A and load slots 13B. While contact sleeve 30 is forced back along barrel 31, by contact with the rear portion of the circuit breaker, and moveable shield 12 is in an "open" position, coiled takeup spring 8 exerts a constant downward force via cable 20 and guide clamp 21 such that movement of the circuit breaker away from contact sleeve 30 causes takeup spring 8 to rewind bringing cable 20 onto takeup roller 9 and drawing moveable shield 12 back down to the "closed" position shown in dashed lines in FIG. 2. Also shown in FIG. 4 is a top plate 29 fastened to fixed shield 11 in order to prevent access to the load and line receivers over the top of fixed shield 11 in any attempt to bypass shield assembly 10.

FIG. 5 shows probe 18 in greater detail wherein contact sleeve 30 is slideably mounted on barrel 31 and barrel 31 contains a horizontally extending slot 34 which cooperates with pins 33 extending through contact sleeve 30 to guide the motion of contact sleeve 30 along barrel 31. Barrel end 35 can be closed or opened. A compression spring 32 is inserted within contact sleeve 30 for the purpose of compensating for the difference in motion between the circuit breaker within the circuit breaker compartment and the motion of moveable shield 12. Pin 37 inserted within opening 36 through contact sleeve 30 contacts compression spring 32 causing compression spring 32 to become completely compressed against barrel portion 38 when moveable shield 12 is fully opened as indicated in FIG. 2. Further motion of moveable shield 12 is prevented by contact with rivets 16 within guide slot 17.

As described earlier, a pair of spring motors 14, 14' probes 18, 18' and cables 20, 20' are employed at both sides of shield assembly 10 as generally depicted in FIG. 1 for the purpose of preventing an operator from using one hand to defeat shield assembly 10 by attempting to manually lift moveable shield 12. The double forces provided by spring motors 14, 14' are sufficient to deter manual lifting of moveable shield 12. Both probes 18, 18' must be contacted simultaneously in order to force moveable shield 12 into its open position. This is an important feature of the instant invention.

We claim:

1. A shield assembly for circuit breaker compartments comprising:
    a pair of fixed and moveable shields arranged for insertion within a circuit breaker compartment, said moveable shield being slideably mounted on said fixed shield;
    an actuating probe mounted on said fixed shield and extending forwardly from said fixed shield for contact with a rear portion of a circuit breaker upon insertion of said circuit breaker to within said breaker compartment;
    a spring motor attached to said fixed shield for providing a downward closing force to said moveable shield when said moveable shield is in an upward open position and said actuator probe is in contact with said circuit breaker; and
    means connecting said spring motor, said probe and said moveable shield for causing said moveable shield to move downward to a closed position when said circuit breaker is moved out of contact with said probe.

2. The shield assembly of claim 1 wherein said fixed shield contains a plurality of openings for providing access to load receivers and line receivers within said breaker compartment and wherein said moveable shield contains a plurality of openings which align coextensively with a portion of said fixed shield openings to provide access between line and load stabs on said circuit breaker and line and load receivers within said breaker compartment.

3. The shield assembly of claim 1 including a collar engageably surrounding said probe and providing guiding between said probe and said fixed shield.

4. The shield assembly of claim 1 wherein said connecting means includes a cable and at least one roller, said cable connecting through a cable guide with said moveable shield to said probe and to a coil takeup spring within said spring motor.

5. The shield assembly of claim 4 wherein said spring motor further includes a takeup roller proximate said coil takeup spring for receiving said cable when said coil takeup spring is in a wound condition and said moveable shield is in a closed condition.

6. The shield assembly of claim 1 wherein said probe comprises a contact sleeve slideably mounted on a barrel for movement of said contact sleeve in a first direction upon contact with a portion of said circuit breaker and for movement in a second direction upon release from contact with said circuit breaker.

7. The shield assembly of claim 5 including a compression spring within said contact sleeve for compensating between the movement of said circuit breaker within said breaker compartment and said moveable shield.

8. The shield assembly of claim 6 including a pin extending through said contact sleeve and contacting said compression spring when said contact sleeve is in contact with said circuit breaker.

9. The shield assembly of claim 7 further including a pair of guide pins extending through a slotted portion of said barrel for directing said contact sleeve along said barrel.

10. The shield assembly of claim 1 further including a top plate attached to said fixed shield to prevent access to said line and load receivers over the top of said fixed shield.

11. A circuit breaker compartment comprising:
    a plurality of line and load stabs extending from one end of said compartment for engagement with line and load receivers attached to one end of a circuit breaker;
    a fixed shield forward of said line and load stabs and a moveable shield moving in and out of registration with openings through said fixed shield for providing access to said line and load stabs;
    a first actuating probe extending through said fixed shield at one side for contacting a first portion of said circuit breaker when said circuit breaker is inserted within said compartment and a second probe extending through an opposite side of said fixed shield for contacting a second portion of said circuit breaker when said circuit breaker is inserted within said compartment; and
    a first spring motor operably connected with said first probe and a portion of said moveable shield for providing a restoring force to said moveable shield when said first probe becomes actuated and a second spring motor subjacent said second probe on said opposite side of said fixed shield and operably coupled with said second probe for providing a restoring force to said moveable shield when said second probe becomes actuated.

12. The breaker compartment of claim 10 wherein said first and second probes comprise a contact sleeve slideably mounted on a barrel and including a compression spring within said contact sleeve for compensating between the motion of said circuit breaker within said compartment and the motion of said moveable shield.

13. The compartment of claim 10 wherein said first and second spring motors comprise a roller and a coiled takeup spring with a cable operably connected with said moveable shield for returning said moveable shield to a closed position when said first and second actuator probes no longer contact said circuit breaker.

14. A method of isolating line and load stabs within a circuit breaker compartment comprising the steps of:

- inserting a fixed shield and a moveable shield forward of the line and load stabs within a circuit breaker compartment, said fixed and moveable shields having openings therein for moving in and out of registration with each other;
- providing a pair of first and second actuator probes at opposite sides of said fixed shield for contacting opposite sides of a circuit breaker upon insertion within said breaker compartment;
- providing first and second spring motors at opposite sides of said fixed shield and operatively coupled with said first and said second probes, respectively, by means of a first and a second cable; and
- attaching one end of each of said first and second cables to each side of said moveable shield for causing said moveable shield to move into a vertical open position when said first and said second probes are contacted by said circuit breaker and for returning to a downward closed position when said circuit breaker is moved away from said probes.

* * * * *

Disclaimer 4,468,531.—*James H. Postlethwait*, Hartford and *William F. Olashaw*, and *Roger Kusek*, Plainville, Conn. SAFETY SHIELD ASSEMBLY FOR A DRAWOUT-TYPE CIRCUIT BREAKER. Patent dated Aug. 28, 1984. Disclaimer filed Nov. 14, 1984, by the assignee, *General Electric Co.*

Hereby enters this disclaimer to all claims of said patent.
[*Official Gazette April 9, 1985.*]